(12) United States Patent
Watanabe

(10) Patent No.: US 6,746,188 B2
(45) Date of Patent: Jun. 8, 2004

(54) MACHINE TOOL

(75) Inventor: Takazumi Watanabe, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 7 days.

(21) Appl. No.: 10/305,079

(22) Filed: Nov. 27, 2002

(65) Prior Publication Data

US 2003/0103826 A1 Jun. 5, 2003

(30) Foreign Application Priority Data

Nov. 30, 2001 (JP) ........................................ 2001-367403

(51) Int. Cl.[7] ................................................. B23C 1/12
(52) U.S. Cl. ........................ 409/201; 409/230; 409/231; 409/232; 409/234
(58) Field of Search ................................ 409/201, 230, 409/231, 232, 234, 193, 189, 211; 408/124, 1 R, 238, 236; 451/5; 33/561

(56) References Cited

U.S. PATENT DOCUMENTS

| 3,752,595 | A | | 8/1973 | Woythal et al. | |
|---|---|---|---|---|---|
| 4,077,736 | A | | 3/1978 | Hutchens | |
| 4,652,190 | A | * | 3/1987 | Corsi | 409/201 |
| 4,716,657 | A | | 1/1988 | Collingwood | |
| 4,741,650 | A | | 5/1988 | Nakata | |
| 4,805,404 | A | | 2/1989 | Dupin | |
| 5,014,542 | A | * | 5/1991 | Corsi | 409/201 |
| 5,238,340 | A | * | 8/1993 | Ochiai et al. | 409/201 |
| 5,286,146 | A | * | 2/1994 | Corsi | 409/201 |
| 5,564,872 | A | | 10/1996 | Veil et al. | |
| 5,636,949 | A | | 6/1997 | Nakamura et al. | |
| 5,697,739 | A | | 12/1997 | Lewis et al. | |
| 5,718,545 | A | * | 2/1998 | Husted | 409/201 |
| 6,357,094 | B1 | * | 3/2002 | Sugimoto | 409/201 |
| 6,428,253 | B1 | * | 8/2002 | Kochsiek | 409/201 |
| 6,474,913 | B2 | | 11/2002 | Katoh et al. | |

FOREIGN PATENT DOCUMENTS

| GB | 2 014 332 A | 8/1979 |
|---|---|---|
| JP | 63-109941 | 5/1988 |

OTHER PUBLICATIONS

U.S. patent application Ser. No. 10/197,267, Katoh et al., filed Jul. 18, 2002.
U.S. patent application Ser. No. 10/268,932, Endo et al., filed Oct. 11, 2002.
U.S. patent application Ser. No. 10/268,987, Kato, filed Oct. 11, 2002.
U.S. patent application Ser. No. 10/270,248, Adachi et al., filed Oct. 15, 2002.
U.S. patent application Ser. No. 10/305,132, Katsumata et al., filed Nov. 27, 2002.

* cited by examiner

Primary Examiner—Erica Cadugan
Assistant Examiner—Dana D Ross
(74) Attorney, Agent, or Firm—Pillsbury Winthrop LLP

(57) ABSTRACT

A machine tool provided with a universal head free from restrictions on its swivel operation due to the presence of a power cable to a motor directly driving a spindle and consequently expanded in range of movement, provided with a ram serving as a support, a swivel member held by the ram to be able to swivel about a predetermined swivel axis, a tool mounting member held at the swivel member, rotatably holding at its front end a spindle to which a tool is mounted, and provided with a motor for driving the spindle, a generator provided at the swivel member and generating power used by the motor, and a power source provided at the ram and supplying power to the generator.

3 Claims, 3 Drawing Sheets

MACHINE TOOL

BACKGROUND OF THE INVENTION

1. Field of the Invention

The present invention relates to a machine tool provided with a universal head.

2. Description of the Related Art

As a machining head of a machining center or other machine tool, there is known a universal head holding a spindle for rotating a tool so as to be able to swivel to a plurality of directions so as to increase the freedom of the machining posture of the tool.

This universal head, for example, is provided with a swivel unit held by a head or ram to be able to swivel in a horizontal plane about a predetermined axis and a tool mount held by the swivel unit to be able to swivel along a vertical plane, rotatably holding a spindle mounting a tool at its front end, and having a built-in motor for directly driving the spindle.

The universal head machines a workpiece by mounting a tool at the front end of the spindle and suitably indexing the swivel positions of the swivel unit and the tool mount while rotating the spindle.

In the above universal head, however, there is the disadvantage that routing the cable for supplying power to the built-in motor driving the spindle becomes complicated. That is, the cable for supplying power to the built-in motor is connected to the built-in motor provided in the tool mount from the ram or head side through the swivel unit.

Therefore, it is difficult to enable the swivel unit to swivel by 360 degrees or more with respect to the ram or head. If the swivel unit cannot swivel by 360 degrees or more, for example the tool cannot be made to contact the entire outer circumference of the workpiece by a swivel operation of the swivel unit.

In this way, there was the disadvantage that the range of operation of the swivel unit was restricted by the presence of the cable for supplying power to the built-in motor.

SUMMARY OF THE INVENTION

An object of the present invention is to provide a machine tool provided with a universal head free from restrictions on its swivel operation due to the presence of a power cable to a motor directly driving a spindle and consequently expanded in range of movement.

To attain the above object, there is provided a machine tool having a support; a swivel unit held at the support to be able to swivel about a predetermined axis; a tool mount held at the swivel unit, rotatably holding at its front end a spindle to which a tool is mounted, and provided with a motor for driving the spindle; a generator provided at the swivel unit and generating power used by the motor; and a power source provided at the support and supplying power to the generator.

Preferably, the power source comprises a motor built into the support, an output shaft of the motor and an input shaft of the generator are connected, and the output shaft and input shaft are concentric with the axis.

Preferably, the tool mount is held at the swivel unit to be able to swivel about a predetermined axis.

In the present invention, the generator provided at the swivel unit is supplied with power from a power source provided at the support and generates electric power. The electric power generated by the generator is supplied to the motor provided at the tool mount to drive the spindle and rotate the tool. In this way, there is no power cable between the support and the swivel unit held at the support to be able to swivel, so the range of swivel of the swivel unit is not restricted.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

A preferred embodiment of the present invention will be described in detail below while referring to the attached figures.

Figure 1:
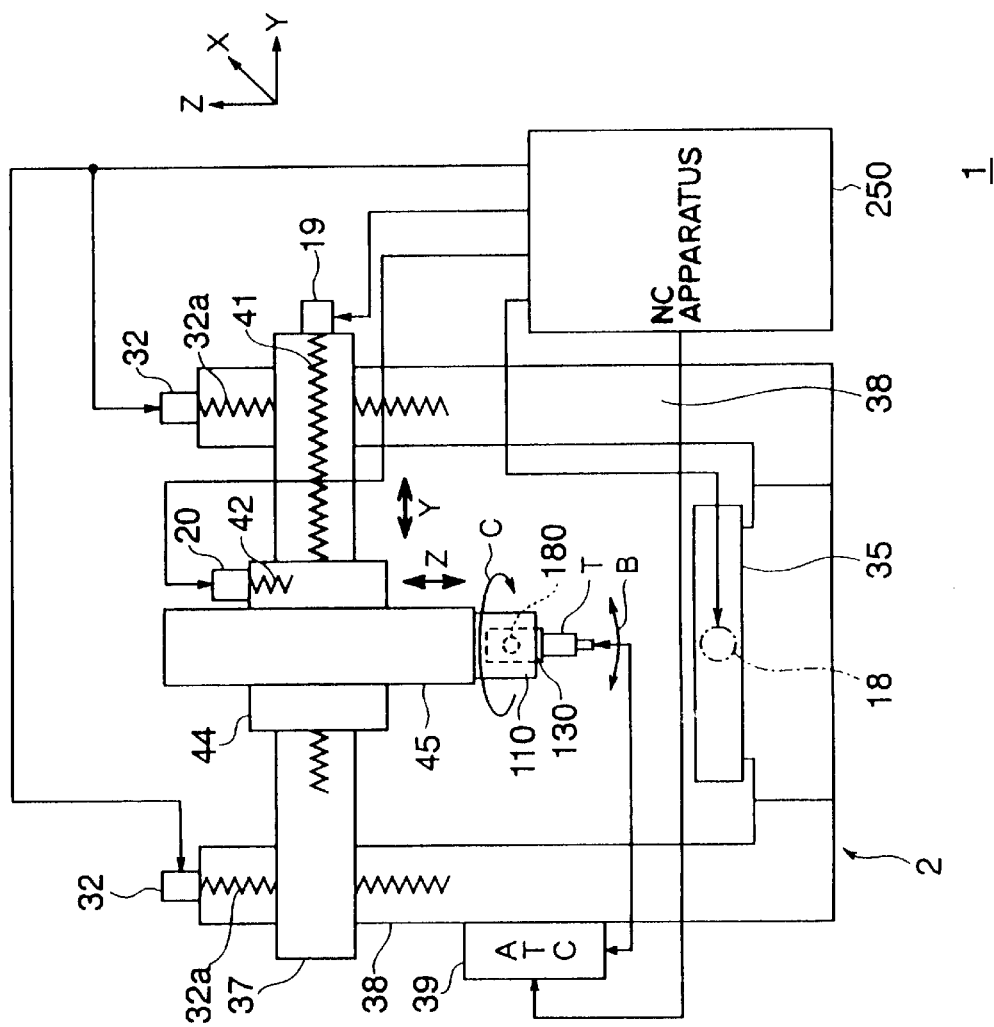
FIG. 1 is a view of the configuration of a machining center as a machine tool of an embodiment of the present invention.

FIG. 1 is a view of the configuration of a machining center as a machine tool of an embodiment of the present invention. Note that the machining center is a numerically controlled machine tool able to perform so-called composite machining.

The machining center 1 is provided with a machine tool body 2 and a numerical control apparatus (NC apparatus) 250.

In FIG. 1, the machine tool body 2 is provided with a cross rail 37 movably supported at its two ends by gate type columns 38. A ram 45 is provided movably in the vertical direction (Z-axis direction) through a saddle 44 movably supported on the cross rail 37. Note that the ram 45 is an embodiment of the support of the present invention.

The saddle 44 is provided with a not illustrated nut part passing through the cross rail 37 in a horizontal direction. A feed shaft 41 with a screw part formed on the outer circumference is screwed into this nut part.

A servo motor 19 is connected with an end of the feed shaft 41. The feed shaft 41 is driven to rotate by the servo motor 19.

By driving the rotation of the feed shaft 41, the saddle 44 moves in the Y-axis direction. By this, the ram 45 is moved and positioned in the Y-axis direction.

Further, the saddle 44 is provided with a not illustrated nut part in the vertical direction. The feed shaft 42 with a screw part formed on the outer circumference is screwed into this nut part. A servo motor 20 is connected with an end of the shaft 42.

The servo motor 20 drives the feed shaft 42 to rotate. By this, the ram 45 provided movably on the saddle 44 is moved and positioned in the Z-axis direction.

The bottom end of the ram 45 is provided with a swivel member 110 held to be able to swivel about the axial center of the ram 45 in the direction indicated by the arrow C. The swivel member 110 holds a tool mounting member 130 to be able to swivel about a shaft 180 in the direction indicated by the arrow B.

The tool mounting member 130 mounts a tool T at its front end. The tool is for example an end mill, drill, etc.

Note that the structure around the bottom end of the ram 45 including the swivel member 110 and tool mounting member 130 will be explained later.

Below the ram 45 is provided movably in the X-axis direction a table 35 to which the workpiece to be machined is affixed. This engages with not shown feed shaft provided along the X-axis direction. This not shown feed shaft is connected to a servo motor 18.

The table 35 is moved and positioned in the X-axis direction by being driven by the servo motor 18.

The two gate type columns 38 are formed with not shown nut parts. The cross rail 37 is raised and lowered by the rotation of the feed shaft 32a screwed into it by cross rail elevation motors 32.

An automatic tool changer (ATC) 39 automatically changes the tools T at the tool mounting member 130.

This automatic tool changer 39 stores in a not shown magazine for example end mills, drills, and various other types of tools T. It returns a tool T attached to the tool mounting member 130 in the magazine by a not shown tool changing arm and attaches a necessary tool T at the tool mounting member 130 by the tool changing arm.

The NC apparatus 250 controls the drive operations of the servo motors 18, 19, and 20 and the cross rail elevation servo motors 32.

The NC apparatus 250 specifically controls the positions and speeds of the tool T and workpiece by the servo motors 18, 19, 20, and 32 in accordance with a machining routine of the workpiece defined in advance in a machining program.

Further, the NC apparatus 250 automatically changes various tools T by for example decoding the tool changing operation of the tool T defined by for example an M-code in the NC program.

Further, the NC apparatus 250 controls the position and speed of the motor built in the ram 45, explained later.

Figure 2:
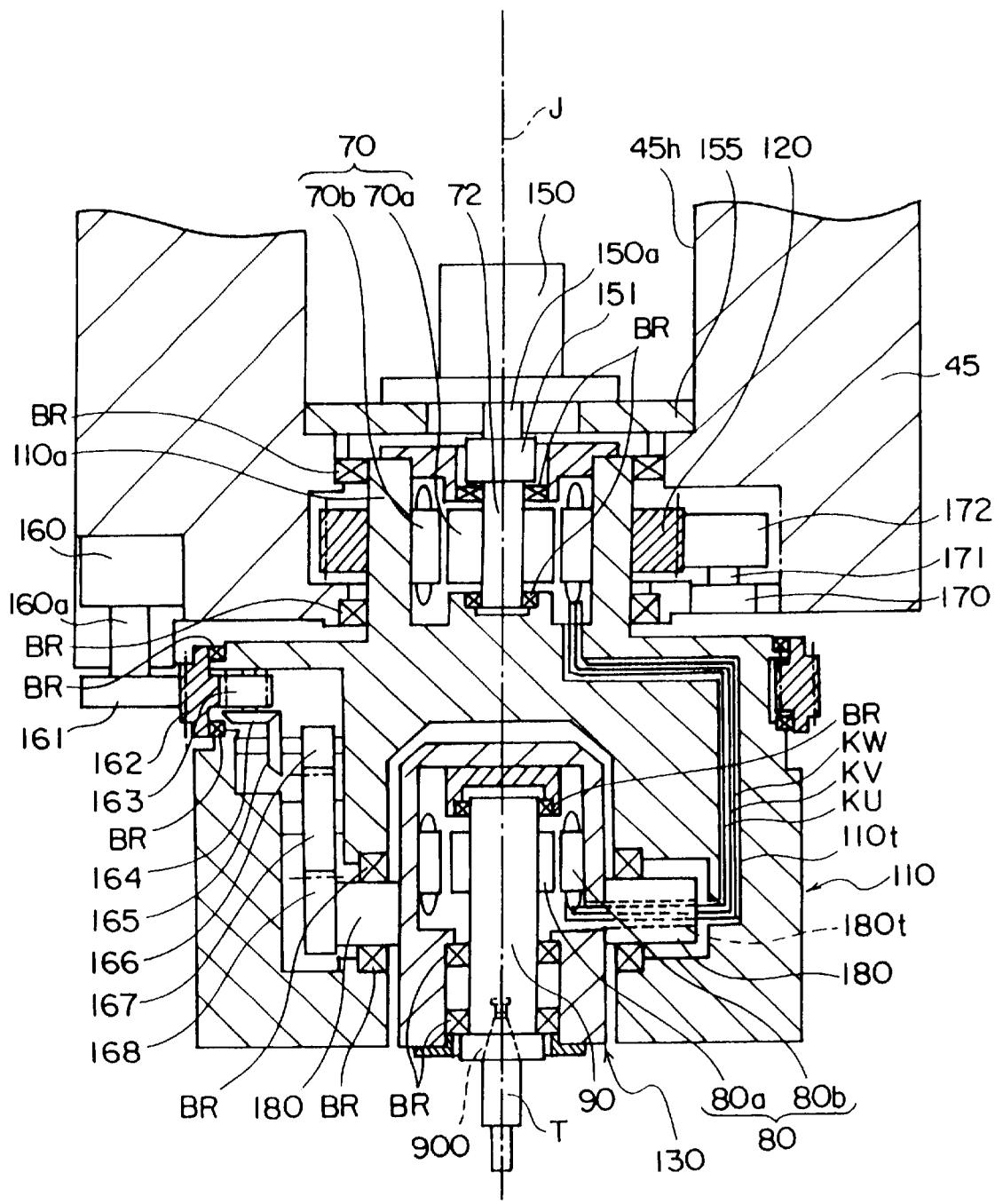
FIG. 2 is a sectional view of the structure around the bottom end of a ram including a swivel member and tool mounting member.

FIG. 2 is a sectional view of the structure around the bottom end of the ram 45 including the swivel member 110 and the tool mounting member 130.

As shown in FIG. 2, the ram 45 has fixed to its inner circumference 45h a motor 150 through a support member 155. This motor 150 is arranged so that its drive shaft 150a is concentric with the axial center J of the ram 45. Further, the motor 150 is controlled in speed by the NC apparatus 250. The motor 150 is an embodiment of the power source of the present invention.

The ram 45 rotatably holds about the axial center J at the inner circumference of its bottom end a cylindrical top end 110a of the swivel member 110 through a plurality of bearings BR.

The top end 110a of the swivel member 110 rotatably holds at its inner circumference a shaft 72 through a plurality of bearings BR. This shaft 72 is arranged to be concentric with the axial center of the ram 45.

This shaft 72 is connected by a coupling 151 to a drive shaft 150a of the motor 150.

The shaft 72 has a rotor 70a of the generator 70 fixed to it. The top end 110a of the swivel member 110 has a stator 70b fixed to its inner circumference at a position facing the rotor 70a.

The generator 70 may be used for example a three-phase synchronous generator.

The top end 110a of the swivel member 110 has affixed to its outer circumference a sun gear 120. The sun gear 120 is engaged with a gear 172 fixed to a drive shaft 171 of a servo motor 170 fixed to the bottom end of the ram 45.

The servo motor 170 is controlled in rotational position by the NC apparatus 250. Due to the rotation of this servo motor 170, the swivel member 110 swivels about the axial center J of the ram 45. By controlling the rotational position of the servo motor 170, the swivel member 110 is indexed about the axial center J.

The swivel member 110 rotatably holds at its bottom side through the bearings BR shafts 180, 180 provided to stick out from the two side faces of the tool mounting member 130.

The tool mounting member 130 rotatably holds inside it a spindle 90 through a plurality of bearings BR. The front end of the spindle 90 is formed with a mount 90a to which a tool T is mounted.

The mount 90a of the spindle 90 is provided with a taper sleeve with which a taper shank of a tool T is engaged. The spindle 90 has a built-in not shown clamp mechanism for clamping a pull stud of the tool T.

The spindle 90 has affixed to its middle part a rotor 80a of a motor 80. The tool mounting member 130 has affixed to its inner circumference a stator 80b of the motor 80 at a position facing the rotor 80a.

The motor 80 may be used for example a three-phase induction motor.

The three-phase winding of the stator 80b of the motor 80 is electrically connected to a plurality of conductor cables KU, KV, and KW led to the inner circumference of the tool mounting member 130 through a passage 180t passing through the center of the shaft 180 provided at one side face of the tool mounting member 130.

The plurality of conductor cables KU, KV, and KW are electrically connected to the three-phase winding of the stator 70b of the generator 70 through a passage 110t formed in the swivel member 110.

The shaft 180 provided at the other side face of the tool mounting member 130 has a gear 168 affixed to its front end. The gear 168 engages with a gear 167 rotatably held at the swivel member 110. The gear 167 is engaged with a gear 166 rotatably held at the swivel member 110. The gear 166 is connected to a bevel gear 165 by a shaft. The bevel gear 165 is engaged with a bevel gear 164 connected to a gear 163.

The gear 163 is engaged with teeth at the inner circumference of a sun gear 162 rotatably held at the outer circumference of the swivel member 110 through a plurality of bearings BR.

The teeth at the outer circumference of the sun gear 162 are engaged with a gear 161 connected to a drive shaft 160a of a servo motor 160 fixed to the bottom end of the ram 45.

The servo motor 160 is controlled in rotational speed by the NC apparatus 250. When the gear 161 rotates by being driven by the servo motor 160, the rotation is transmitted to the shaft 180 through the sun gear 162, gear 163, bevel gears 164, 165, and gears 166, 167, 168. Due to this, the tool mount 130 swivels about the shaft 180. By controlling the rotational drive of the servo motor 160, the tool mount member 130 is indexed about the shaft 180.

Next, an example of the operation of a machining center having the above configuration will be explained.

First, the automatic tool changer 39 mounts a desired tool T in the mount 90a of the spindle 90.

From this state, the motor 150 is driven. When the motor 150 is made to rotate by a rotational speed $N_0$, the shaft 72 rotates and the rotor 70a of the generator 70 rotates relative to the stator 70b. Due to this, the generator 70 generates three-phase AC power when using a three-phase synchronous generator.

The frequency F of the three-phase AC power generated by the three-phase synchronous generator is expressed by the following formula (1) when the number of poles of the three-phase synchronous generator is $P_1$ and the rotational speed of the motor 150 is $N_0$ (min$^{-1}$):

$$F=P_1 \times N_0/120 (min^{-1}) \quad (1)$$

Therefore, if the motor 150 is made to rotate at the rotational speed No, three-phase AC power of the frequency F expressed by the above formula (1) is supplied to the motor 80.

Here, if using a three-phase induction motor for the motor 80, if the number of poles of the three-phase induction motor is $P_2$, the three-phase induction motor will rotate by $2/P_2$ in one cycle of the three-phase alternating current, so the synchronous speed $N_1$ of the three-phase induction motor at the time of no slip is expressed by the following formula (2):

$$N_1 = 120 \times F/P_2 (min^{-1}) \quad (2)$$

Therefore, the rotational speed $N_1$ of the motor 80 is expressed by the following formula (3) with respect to the rotational speed $N_0$ of the motor 150:

$$N_1 = N_0 \times P_1/P_2 (min^{-1}) \quad (3)$$

As will be understood from formula (3), the rotational speed No of the motor 150 is changed to the rotational speed $N_1$ expressed by the above formula (3).

As shown by formula (3), it is understood that by suitably setting the ratio between the number of poles $P_1$ of the three-phase synchronous generator and the number of poles $P_2$ of the three-phase induction motor, the ratio of the rotational speed $N_1$ of the motor 80 (tool T) to the rotational speed $N_0$ of the motor 150 can be freely set.

That is, when desiring to increase the rotational speed $N_0$ of the motor 150, the number of poles ratio $P_1/P_2$ is made larger than 1, while when desiring to decrease it, the number of poles ratio $P_1/P_2$ is made smaller than 1, by preselecting the number of poles $P_1$ of the three-phase synchronous generator and the number of poles $P_2$ of the three-phase induction motor.

In this way, by making the workpiece fixed to the table 35 and the tool T move relative to each other in accordance with the machining program in the state with the tool T rotating, the workpiece is cut.

At this time, by indexing the swivel member 110 about the axial center J and the tool mounting member 130 about the shaft 180, it is possible to position the tool T in various postures with respect to the workpiece and for example possible to machine complicated shapes.

The swivel member 110 can rotate by 360 degrees or more in any direction about the axial center J.

Therefore, it is possible to machine the entire circumference of a circular cross-section workpiece by just swiveling the swivel member 110.

Figure 3A:
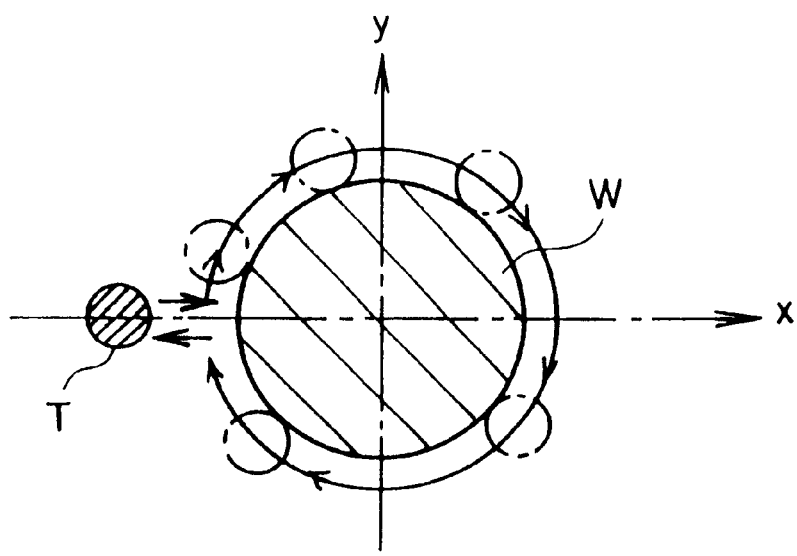
FIGS. 3A and 3B are views for explaining examples of the path of machining of a tool in a machine tool of the present invention.

For example, as shown in FIG. 3A, the tool T is made to approach the workpiece W from the radial direction, the tool T is positioned at a location contacting part of the outer circumference of the workpiece W, and the swivel member 110 swivels to make the tool T circle the outer circumference of the workpiece W clockwise. After the tool T reaches the position where it first contacted the workpiece W, the tool T is moved away from the workpiece W in the radial direction.

By moving the tool T in this way, it is possible to easily cut the entire circumference of the workpiece W.

Figure 3B:
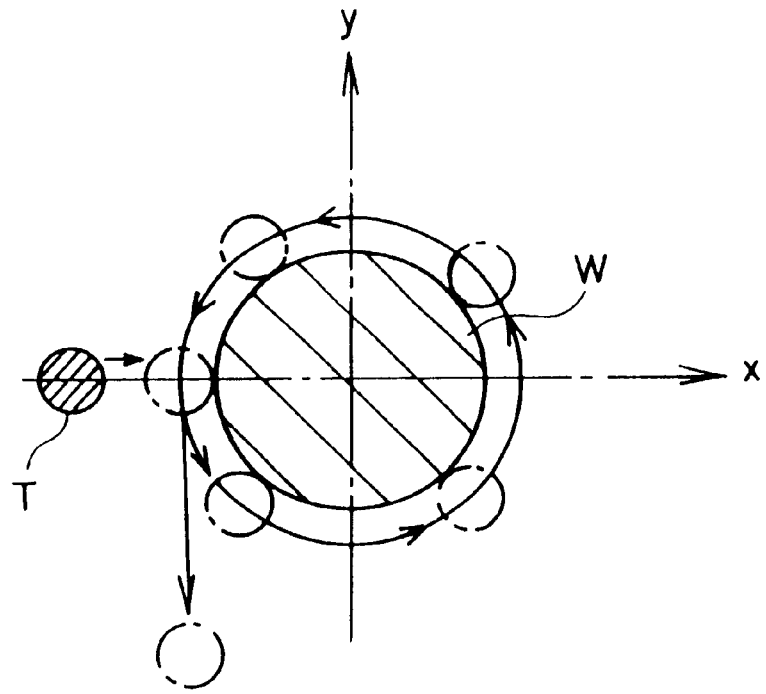

Further, as shown in FIG. 3B, the tool T approaches the workpiece W from the radial direction, the tool T is positioned at a location contacting part of the outer circumference of the workpiece W, and the swivel member 110 swivels to make the tool T circle the outer circumference of the workpiece W counterclockwise.

When the tool T reaches the position where it first contacted the workpiece W, the tool T moved as it is in the tangential direction to make the tool T move away from the workpiece W.

Even if moving the tool T in this way, it is possible to easily cut the entire circumference of the workpiece W.

As explained above, according to the present embodiment, since there are no wires between the ram 45 and the motor 80 built in the tool mounting member 130, the swivel range of the swivel member 110 with respect to the ram 45 is not restricted in any way. Therefore, it becomes possible to improve the machining capability of the machining center 1.

Further, according to the present embodiment, even if the maximum rotational speed of the motor 150 provided in the ram 45 is restricted, if the generator 70 and the motor 80 are suitably selected, it becomes possible to make the tool T rotate by a rotational speed exceeding the maximum rotational speed of the motor 150 and machine the workpiece at a high speed.

Further, according to the present embodiment, since the power generated by the generator 70 is used to directly drive the tool T, there is no need for a gear mechanism or other transmission mechanism from the motor 150 to the tool T, the heat is not increased as with a gear device, heat expansion of the tool T is suppressed, and the reduction in the machining tolerance is suppressed.

Note that the present invention is not limited to the above embodiment,

In the above embodiment, the explanation was made of the case of the ram 45 as the support of the present invention, but the support may also be for example a fixed head in addition to the ram 45.

Further, in the above embodiment, the explanation was made of the case of a motor 150 as the power source of the present invention, but for example the invention may also be configured to use compressed air etc. to cause the generator 70 to generate power.

Further, in the above embodiment, the tool mounting member 130 was also configured to be able to swivel about the shaft 180, but for example the present invention can also be applied even when the tool mounting member 130 is fixed to the swivel member 110.

According to the present invention, a machine tool provided with a universal head free from restrictions on its swivel operation due to the presence of a power cable to a motor directly driving a spindle and consequently expanded in range of movement is obtained.

While the invention has been described with reference to a specific embodiment chosen for purpose of illustration, it should be apparent that numerous modifications could be made thereto by those skilled in the art without departing from the basic concept and scope of the invention.

What is claimed is:

1. A machine tool comprising:
   a support;
   a swivel unit held at said support to be able to swivel about a predetermined axis;
   a tool mount held at said swivel unit, rotatably holding at its front end a spindle to which a tool is mounted, and provided with a motor for driving said spindle;

a generator provided at said swivel unit and generating power used by said motor; and a power source provided at said support and supplying power to said generator.

2. A machine tool as set forth in claim 1, wherein said power source comprises a motor built into said support, an output shaft of said motor and an input shaft of said generator are connected, and said output shaft and input shaft are concentric with said predetermined axis.

3. A machine tool as set forth in claim 1, wherein said tool mount is held at said swivel unit to be able to swivel about a predetermined axis.

* * * * *